3,115,524
BICYCLOHEPTYL, ARALKYL-UREAS
Seymour L. Shapiro, Hastings on Hudson, and Louis Freedman, Bronxville, N.Y., assignors to U.S. Vitamin & Pharmaceutical Corporation, New York, N.Y., a corporation of Delaware
No Drawing. Filed Mar. 15, 1961, Ser. No. 95,833
2 Claims. (Cl. 260—553)

This invention is concerned with novel secondary amines derived by the alkylation of (2,5-endomethylene)-cyclohexylmethylamine and in particular the secondary amines of the following structure:

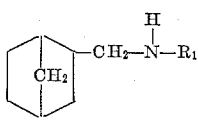

wherein $R_1$ is a cycloalkylalkyl radical or aralkyl radical having a carbon content of $C_7$–$C_9$ and embodies as well haloaralkyl radicals and polyhaloaralkyl radicals such as for example o-chlorobenzyl, 3,4-dichlorobenzyl, p-chloro-β-phenethyl and the like.

The secondary amines of this invention have therapeutic utility per se, particularly as local anesthetic agents of high potency, and serve as intermediates as well for the preparation of the ureas of the formula shown:

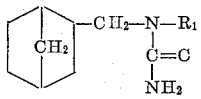

These ureas, in turn, are useful pharmacological agents and show particular effectiveness as anti-inflammatory agents and muscle relaxants.

In the practice of this invention, the (2,5-endomethylene)-cyclohexylmethylamine is treated in aqueous acetonitrile with aralkyl halide or cycloalkyl alkyl halide, using sodium hydroxide as an acid scavenger, following the procedure described by Shapiro et al., J. Am. Chem. Soc. 81,3728 (1959).

In addition to the secondary amine, quantities of the tertiary amine of the structure:

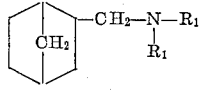

are obtained.

Compounds typical of this invention are shown in the table, wherein $R_2$ is introduced to distinguish between the classes of compounds involved, i.e., $R_2$=H gives the secondary amine, $R_2$=$R_1$ gives the tertiary amine, and $R_2$=—$CONH_2$ gives the urea.

TABLE

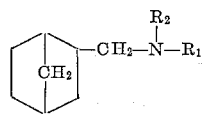

| $R_1$ | M.P. °C[a] (RS)[b] or B.P. (mm. press.) | Formula | Carbon Calc. | Carbon Found | Hydrogen Calc. | Hydrogen Found | Nitrogen Calc. | Nitrogen Found |
|---|---|---|---|---|---|---|---|---|
| \multicolumn{9}{c}{$R_2$=hydrogen} |
| $C_6H_5CH_2$— | 116–120(0.5) | $C_{15}H_{21}N$ | 83.7 | 83.6 | 9.8 | 10.5 | 6.5 | 6.3 |
| o—$ClC_6H_4CH_2$— | 130–136(0.4) | $C_{15}H_{20}ClN$ | 72.1 | 72.2 | 8.1 | 8.8 | 5.6 | 5.7 |
| p—$ClC_6H_4CH_2$— | 148–152(0.5) | $C_{15}H_{20}ClN$ | | | | | 5.6 | 6.0 |
| 3,4—$diClC_6H_3CH_2$—[c] | 260–265(A) | $C_{15}H_{20}Cl_3N$ | 56.2 | 57.0 | 6.3 | 6.5 | | |
| $C_6H_5CHCH_3$ | 94–98(0.15) | $C_{16}H_{23}N$ | 83.8 | 83.6 | 10.1 | 10.9 | | |
| $C_6H_5CHCH_3$—[d] | 289–290(B) | $C_{16}H_{24}BrN$ | 61.9 | 61.9 | 7.8 | 8.1 | 4.5 | 4.7 |
| $C_6H_5CH_2CH_2$— | 136–142(0.5) | $C_{16}H_{23}N$ | 83.8 | 83.9 | 10.1 | 10.2 | 6.1 | 5.9 |
| $C_6H_5CH_2CH_2$—[d] | 285–290(A) | $C_{16}H_{24}BrN$ | 61.9 | 61.9 | 7.8 | 7.9 | 4.5 | 4.4 |
| $C_6H_{11}CH_2CH_2$—[e] | 120–122(0.1) | $C_{16}H_{29}N$ | | | | | 6.0 | 6.1 |
| \multicolumn{9}{c}{$R_2$=$R_1$} |
| $C_6H_5CH_2$— | 166–170(0.5) | $C_{22}H_{27}N$ | 86.5 | 86.3 | 8.9 | 9.4 | 4.6 | 4.6 |
| o—$ClC_6H_4CH_2$— | 192–196(0.5) | $C_{22}H_{25}Cl_2N$ | 70.6 | 70.7 | 6.7 | 7.9 | 3.7 | 3.6 |
| p—$ClC_6H_4CH_2$— | 204–210(0.5) | $C_{22}H_{25}Cl_2N$ | 70.6 | 71.0 | 6.7 | 7.1 | 3.7 | 3.7 |
| 2,4—$diClC_6H_3CH_2$— | 90–91(B) | $C_{22}H_{23}Cl_4N$ | | | | | 3.1 | 3.1 |
| 3,4—$diClC_6H_3CH_2$— | 230–238(0.05) | $C_{22}H_{23}Cl_4N$ | | | | | 3.1 | 3.1 |
| $C_6H_5CHCH_3$— | 170–176(0.1) | $C_{24}H_{31}N$ | 86.4 | 86.2 | 9.4 | 9.5 | 4.2 | 4.3 |
| $C_6H_5CH_2CH_2$— | 184–186(0.5) | $C_{24}H_{31}N$ | 86.4 | 86.6 | 9.4 | 9.9 | 4.2 | 4.0 |
| $C_6H_{11}CH_2CH_2$—[e] | 190–198(0.1) | $C_{24}H_{43}N$ | 83.4 | 84.2 | 12.5 | 12.2 | 4.1 | 3.7 |
| \multicolumn{9}{c}{$R_2$= —$CONH_2$} |
| $C_6H_5CH_2$— | 102–104(C) | $C_{16}H_{22}N_2O$ | 74.4 | 74.4 | 8.6 | 8.2 | 10.8 | 10.8 |
| p—$ClC_6H_4CH_2$— | 146–148(D) | $C_{16}H_{21}ClN_2O$ | 65.7 | 65.7 | 7.2 | 6.5 | 9.6 | 9.6 |
| $C_6H_5CH_2CH_2$— | 77–79(D) | $C_{17}H_{24}N_2O$ | 75.0 | 75.3 | 8.9 | 9.1 | | |
| $C_6H_{11}CH_2CH_2$—[e] | 106–108(C) | $C_{17}H_{30}N_2O$ | | | | | 10.1 | 10.3 |

[a] Melting points were determined on a Fisher-Johns melting point apparatus and are not corrected.
[b] RS is recrystallizing solvent: A=ethanolisopropyl alcohol; B=isopropyl alcohol; C=hexane; D=acetonitrile.
[c] Hydrochloride of indicated base.
[d] Hydrobromide of preceding compound.
[e] $C_6H_{11}CH_2CH_2$— is cyclohexylethyl.

The secondary amines of this invention form salts with the strong mineral acids such as for example hydrobromides and hydrochlorides and in their employment as pharmacological agents, this is the preferred form for these compounds.

The ureas of this invention are sparingly soluble in water although they show oral activity upon administration in pharmacological testing, indicating that they are absorbed on administration through this route.

As illustrative of the practice of this invention, the following examples are given, which are not to be considered as limiting.

*Example 1*

N-(o-CHLOROBENZYL)-(2,5-ENDOMETHYLENE)-CYCLO-HEXYL-METHYLAMINE

A mixture of 25 g. (0.2 mole) of (2,5-endomethylene)-cyclohexylmethylamine in 47 ml. of water, 20 ml. of 40% soduim hydroxide and 34 ml. of acetonitrile, was treated with 32.2 g. (0.2 mole) of o-chlorobenzyl chloride in 26 ml. of acetonitrile. The reaction mixture was securely stoppered, shaken intermittently during a storage period of 72 hours at 20° and then decanted into 660 ml. of water. The formed oil was separated, dissolved in ether, dried (anhydrous magnesium sulfate), the ether evaporated, and the product distilled. Upon fractional distillation, the product was obtained at 130–136° at 0.4 mm. whereas the tertiary amine reflecting addition of 2-o-chlorobenzyl groups was obtained as a fraction, boiling at 192–196° at 0.5 mm.

In a similar fashion the other secondary amines described in the table were obtained along with the corresponding tertiary amines, upon substituting the appropriate halide and their properties have been noted in the table above. The secondary amines on treatment with an equivalent of hydrochloric acid or hydrobromic acid afford the corresponding hydrohalide salt.

EXAMPLE 2

N¹-(2,5-ENDOMETHYLENE)-CYCLOHEXYLMETHYL, N¹-p-CHLOROBENZYL UREA

A mixture of 3 g. (0.012 mole) of N-p-chlorobenzyl-(2,5-endomethylene)-cyclohexylmethylamine and 2 g. of nitrourea in 15 ml. of ethanol was heated on the steam bath with noted evolution of gas. After one hour the ethanol was removed, and the oily residue on treatment with 15 ml. of ethanol followed by 5 ml. of water precipitated the product, 4.1 g., melting point 125–140°, which was recrystallized (acetonitrile) to give 2.3 g. of pure product, melting point 146–148°.

In a similar manner the secondary amines shown in the table above are converted to the corresponding ureas and typical other examples have been characterized in the table.

It is to be understood that it is intended to cover all changes and modifications of the examples of the invention herein chosen for the purpose of illustration which do not constitute departures from the spirit and scope of the invention.

We claim:

1. The compound of the formula

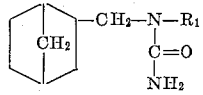

wherein $R_1$ is selected from the group consisting of phenyl-lower alkyl and chlorophenyl-lower alkyl, wherein the lower alkyl has from 1 to 3 carbon atoms.

2. The compound of claim 1, wherein $R_1$ is p-chlorobenzyl.

References Cited in the file of this patent

UNITED STATES PATENTS

| | | |
|---|---|---|
| 1,785,730 | Davis | Dec. 23, 1930 |
| 2,673,877 | Thompson | Mar. 30, 1954 |
| 2,831,027 | Pfister | Apr. 15, 1958 |
| 2,838,568 | Brust | June 10, 1958 |

FOREIGN PATENTS

| | | |
|---|---|---|
| 1,081,453 | Germany | May 12, 1960 |
| 497,042 | Great Britain | June 13, 1938 |
| 573,509 | Great Britain | Aug. 17, 1944 |

OTHER REFERENCES

Fieser: Organic Chemistry (1956), pages 46–47.